3,342,779
PROCESS FOR PRODUCING ALPHA-POLYOXYMETHYLENE
Seiichi Maeda, Kamakura, and Yasuhiko Miyake, Fujisawa, Japan, Yoshinari Yanagisawa, Princeton, N.J., and Masaji Hamamoto, Kamakura, Japan, assignors to Toyo Koatsu Industries, Incorporated, Tokyo, Japan, a corporation of Japan
No Drawing. Filed July 3, 1963, Ser. No. 292,763
5 Claims. (Cl. 260—67)

This invention relates to a process for producing alpha-polyoxymethylene from an aqueous solution for formaldehyde.

A new resin called an acetal resin has recently made its debut. It is known that such acetal resins are composed mostly of so-called polyoxymethylene made by highly polymerizing formaldehyde, $CH_2O$.

The formaldehyde monomer which is a raw material for this resin can be easily obtained by thermodecomposing alpha-polyoxymethylene. However, if the alpha-polyoxymethylene is impure or, more specifically, is high in water content, the yield of the monomer is very low. It is therefore important to establish a process for economically producing a highly pure anhydrous formaldehyde monomer which is eminently suitable as a raw material for making said polymer.

Alpha-polyoxymethylene is a solid formaldehyde polymer containing about 99% formaldehyde and is produced by causing an acid or alkaline substance to act on an aqueous solution of formaldehyde. According to Staudinger and Walker, alpha-polyoxymethylene is a mixture of polyoxymethylene-glycols represented by the general formula $HO(CH_2O)_nH$ wherein $n$ represents the degree of polymerization and is at least 100.

However, it is very difficult to produce a highly pure and uniform alpha-polyoxymethylene, because of the concurrent production of paraformaldehyde as a by-product which is low in molecular weight, nonuniform and high in water content. Thus, the production of high purity alpha-polyoxymethylene especially on an industrial scale is quite difficult to attain. High purity is an indispensable characteristic of a formaldehyde monomer to be used as a raw material in the production of acetal resins. Whether the acetal resin is made by ion polymerization, with a catalyst or by radioactive ray polymerization, the monomer must be pure and especially must not be contaminated with water.

It is said that the substance known as alpha-polyoxymethylene contains a total of 0.1 to 0.5% water which is either chemically bonded or physically adsorbed. Such water can be removed by a cold trap or any other means in the refining of formaldehyde monomer obtained by the thermodecomposition of alpha-polyoxymethylene but it is desired in the industry that the alpha-polyoxymethylene first be uniform and of low water content. Hence, there exists a strong need for a superior process for producing highly pure, dry, uniform alpha-polymethylene.

Alpha-polyoxymethylene has been obtained, heretofore, by adding an acid or alkaline substance as a catalyst to an aqueous solution of formaldehyde and warming the solution to a temperature below about 40° C. to polymerize the formaldehyde. In prior researches, the amount of the catalyst and the temperature of the reaction have been considerably studied; however, the aqueous solution of formaldehyde itself, that is, the behavior of formaldehyde in the aqueous solution has not been so thoroughly studied. Generally, when formaldehyde is warmed to a point below about 40° C. and polymerized with a catalyst, there results an alpha-polyoxymethylene which is low in degree of polymerization and/or which is nonuniform and which is high in water content. Therefore, in refining the formaldehyde monomer obtained by thermodecomposing this polymer, a very low yield of monomer is obtained.

An object of the present invention is to provide a process for producing alpha-polymethylene which is high in purity and uniformity.

Another object is the provision of a process for producing alpha-polyoxymethylene in high yield.

Another object is the provision of a process for producing alpha-polyoxymethylene which is eminently suited for use in the manufacture of formaldehyde monomer for the manufacture of polyoxymethylene for acetal resins.

Another object is the provision of high purity, uniform alpha-polyoxymethylene which can be readily converted to formaldehyde monomer in high yield.

We have noted the equilibrium of $CH_2O$, $CH_2(OH)_2$ and $HO(CH_2O)_nH$ in aqueous solutions of formaldehyde and have confirmed that, when formaldehyde is made to react in the presence of a catalyst, the alpha-polyoxymethylene produced is considerably different depending on the temperature conditions of the aqueous solution of formaldehyde prior to polymerization.

The present invention is characterized by the process of holding the aqueous solution of formaldehyde at a temperature of 60 to 98° C. for 30 minutes to 3 hours as a pretreatment, then reducing the temperature of the solution down to less than 50° C., adding a catalyst gradually at this temperature and then cooling the solution gradually down to a temperature not lower than 10° C.

Previously, alpha-polyoxymethylene had been produced by causing an aqueous solution of formaldehyde to react in the presence of, for example, sodium hydroxide for a fixed time and then allowing the solution to cool in acquiescence to permit crystals of alpha-polyoxymethylene to grow. However, we have come to know that, if the aqueous solution of formaldehyde is first warmed as a pretreatment to a temperature which is higher than the reaction temperature and, more specifically in the range of 60 to 98° C., the production of alpha-polyoxymethylene of high purity and uniformity is obtained.

The reason for this has not yet been established but can be theorized as follows. Formaldehyde in an aqueous solution maintains the equilibrium represented by the following formula.

$$H_2O + CH_2O \rightleftarrows CH_2(OH)_2 \rightleftarrows HO \cdot CH_2O \cdot CH_2OH$$
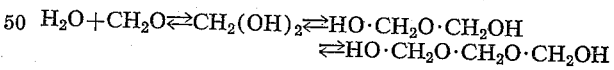
$$\rightleftarrows HO \cdot CH_2O \cdot CH_2O \cdot CH_2OH$$

It has been found that, if aqueous solution of formaldehyde is warmed at 60° C. to 98° C., the equilibrium moves leftward. The composition is enriched thereby in $CH_2(OH)_2$ which is favorable to the formation of alpha-polyoxymethylene. Thus, the presence of those oligomers which inhibit the growth of molecules is prevented in advance.

The specific pretreating temperature to be used should be selected in relation to the movement of the equilibrium in accordance with differences in the concentration of formaldehyde in the aqueous solution. However, when the temperature reaches 100° C. (the boiling point of water), the concentration of the solution varies so greatly as to be unfavorable. When it is below 60° C., an unduly long time is required to attain the objects of this invention. Therefore, the most preferable pretreating temperature is 60 to 90° C.

When causing a warmed aqueous solution of formaldehyde to undergo reaction in the formation of alpha-polyoxymethylene in the presence of an acid or alkali for a fixed time, a part of formaldehyde decomposes into detrimental methanol and formic acid by Cannizzaro reaction, thus undesirably contaminating the produced alpha-polyoxymethylene. This is avoided by employing a reaction temperature below 50° C. after the acid or alkali is added.

It is also desirable to start the addition of the catalyst just after the warmed aqueous solution of formaldehyde has been quickly cooled to the required reaction temperature, preferably below 50° C., and to add the entire amount of the catalyst over a period of 1 to 5 hours. Furthermore, if the reaction solution to which the catalyst has been completely added is quickly cooled, a polymer of the so-called paraformaldehyde type, in which the molecular weight is low or the water content is high, is byproduced. Therefore, it is desirable, after all the catalyst has been added, to gradually cool the reaction solution down to a temperature not lower than 10° C. over 10 to 30 hours, or preferably 15 to 24 hours, so as to encourage the growth of the molecules.

The precipitate of the produced alpha-polyoxymethylene is separated; washed, if necessary, with water, acetone, alcohol or ether; and is dried. The crystals thus obtained are white, are highly uniform, contain more than 99% $CH_2O$ and less than 0.02% physically deposited water, and have a polymerization degree of more than 150. These crystals easily produce formaldehyde when heated to 150 to 180° C. and the polyoxymethylene resin obtained by polymerizing this formaldehyde is of extremely excellent quality.

The aqueous solution of formaldehyde used as a raw material in this invention can be commercial formalin containing about 40% $CH_2O$, but any other formaldehyde solution of any concentration can be used. From the industrial point of view, a solution of more than 50% $CH_2O$ is hard to handle, a dilute solution is uneconomical and therefore a solution of about 40% $CH_2O$ is preferred, although aqueous solutions of about 15% to about 50% can be used without undue difficulties. It is preferable to remove methanol, formic acid and other impurities contained in the formalin as much as possible by means of rectification or ion exchange or by any other means.

The catalyst can be an acid or alkaline substance. Alkali metal hydroxides and carbonates, especially such alkaline substances as potassium hydroxide, sodium hydroxide, potassium carbonate or sodium carbonate, are desirable. If an acid is used, an acid radical remains which in some cases is not desired or another different type of polyoxymethylene is produced. Therefore, the alkaline substance is more preferable. The catalyst is normally employed in amounts in the range of 0.6% to 2.7% based on the weight of formaldehyde in the aqueous solution.

The alpha-polyoxymethylene produced by conventional processes not according to this invention, that is, by adding an alkali for reaction without warming the aqueous solution of formalin at 60 to 98° C. as a pretreatment, produced by pretreating the solution at 60 to 98° C. but by adding all the alkali at once or produced without gradually cooling the reaction solution, is of such low molecular weight as paraformaldehyde, or is nonuniform, and is high in water content. Therefore, in the steps of decomposing it and purifying the resulting formaldehyde monomer, more than 20%, or occasionally 30 to 40%, of the formaldehyde monomer is lost. Thus, the rate of yield of a formaldehyde monomer of high purity is less than 80% to the alpha-polyoxymethylene used or about 60% in the extreme case. The alpha-polyoxymethylene obtained by the process according to this invention has no such defects and can produce a formaldehyde monomer of a high purity at a high rate of yield in excess of 85%.

The following examples are presented. In the examples, as elsewhere herein, parts and percentages are by weight unless otherwise specified.

*Example 1*

2100 grams of an aqueous solution of 36.2% formaldehyde containing 0.2% methanol and 0.001% formic acid were warmed at 80° C. for 1 hour. The solution was kept clear and was quickly cooled down to 50° C. Then 5.1 grams of sodium hydroxide as catalyst were gradually added to the solution over a period of 2 hours. The reaction temperature was maintained at 50° C. and the solution was well stirred during the addition period so that the reaction proceeded uniformly. After completion of the catalyst-addition, the stirring was continued and the solution was allowed to gradually cool down to about 20° C. (required about 18 hours) so that the growth of the precipitate was accelerated.

The precipitate was separated, was washed with water and was dried at 45 to 50° C. under a reduced pressure of 5 to 10 mm. Hg for 20 hours. The polymerization degree of the product was at least 150, the purity was more than 99.0% and the water content was less than 0.015%. The yield was about 50% based on the formaldehyde content of the original solution. The product also was high in reproductivity of formaldehyde monomer suitable for polymerization into polyoxymethylene resins. The polyoxymethylene resin obtained by polymerizing the formaldehyde monomer obtained by decomposing this product was so high in thermostability as to be readily adapted for use in the manufacture of plastics. Very importantly, the amount of formaldehyde monomer lost in cold traps in the polymerizing and refining steps used to convert the product into polyoxymethylene resin was less than 10% of the amount of starting monomer. Such favorable results have never before been obtainable.

*Example 2*

1880 grams of an aqueous solution of 40.3% formaldehyde containing 0.2% methanol and 0.001% formic acid were warmed at 90° C. for 2 hours. Then, in the same manner as in Example 1, 20.2 grams of sodium hydroxide were added as catalyst for the reaction. Thus the obtained product was of a polymerization degree of more than 150, a purity of more than 99.0% and a water content of less than 0.02%. The yield was 55% based on the formaldehyde content of the original solution. The polyoxymethylene polymer obtained by using the monomer produced by decomposing this product was so high in thermostability as to be readily adapted for use in the manufacture of finished plastics. Moreover, the amount of the formaldehyde monomer lost in the polymerizing and refining steps used to convert the product into polyoxymethylene resin was less than 15% of the amount of starting monomer.

What is claimed is:

1. In the process of producing alpha-polyoxymethylene from an aqueous formaldehyde solution by adding a basic or acidic catalyst to said solution and thereafter warming said solution to a temperature not higher than 50° C., thereby causing the formaldehyde in said solution to react and form alpha-polyoxymethylene, that improvement comprising the steps of, pretreating said aqueous formaldehyde solution by initially maintaining it at a temperature of about 60° C. to about 98° C. for a period of at least about 0.5 hour and quickly cooling said solution to a temperature of not more than 50° C. prior to adding said catalyst.

2. The improvement as claimed in claim 1 wherein said aqueous formaldehyde solution is pretreated by initially maintaining it at a temperature of about 60 to about 98° C. for a period of 0.5 to 3 hours.

3. The improvement as claimed in claim 1 wherein said catalyst is gradually added over a period of about 1 to about 5 hours.

4. The improvement claimed in claim 3 wherein said aqueous formaldehyde solution is gradually cooled to a temperature not less than about 10° C. over a period of about 10 to about 30 hours after adding said catalyst.

5. A process of producing alpha-polyoxymethylene from an aqueous formaldehyde solution comprising the steps of maintaining said solution at a temperature of about 60° C. to about 98° C. for a period of about 0.5 to about 3 hours, thereafter quickly cooling said solution to a temperature not greater than 50° C., gradually adding a catalytic amount of a catalyst selected from the group consisting of alkali metal hydroxides, alkali metal carbonates, and mixtures thereof over a period of 1 to 5 hours and thereafter gradually cooling said solution to a temperature not less than about 10° C. over a period of about 10 to about 30 hours.

References Cited

UNITED STATES PATENTS

| | | | |
|---|---|---|---|
| 2,551,365 | 5/1951 | Craven | 260—340 |
| 2,568,016 | 9/1951 | MacLean et al. | 260—340 |
| 2,568,017 | 9/1951 | MacLean et al. | 260—340 |
| 2,768,994 | 10/1956 | MacDonald | 260—67 |
| 2,775,619 | 12/1956 | Galat | 260—615 |
| 2,780,652 | 2/1957 | Gander | 260—606 |
| 2,989,508 | 6/1961 | Hudgin et al. | 260—67 |

SAMUEL H. BLECH, *Primary Examiner.*

LOUISE P. QUAST, WILLIAM H. SHORT,
*Examiners.*

L. M. PHYNES, *Assistant Examiner.*